Sept. 13, 1938.　　　　E. A. ALBRIGHT　　　　2,129,634
OVEN CONSTRUCTION
Filed Aug. 24, 1936　　　　5 Sheets-Sheet 1
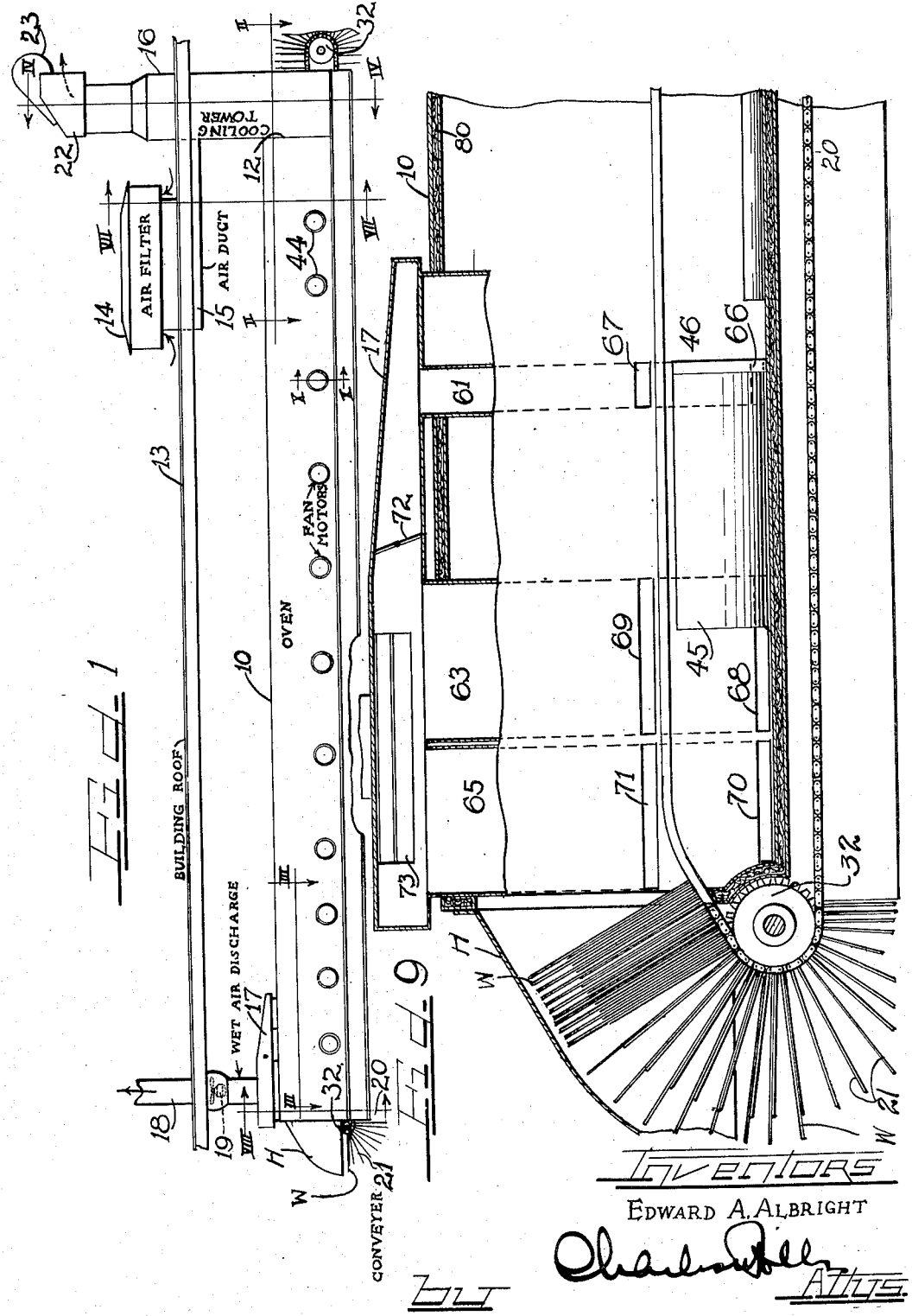
Inventors
EDWARD A. ALBRIGHT

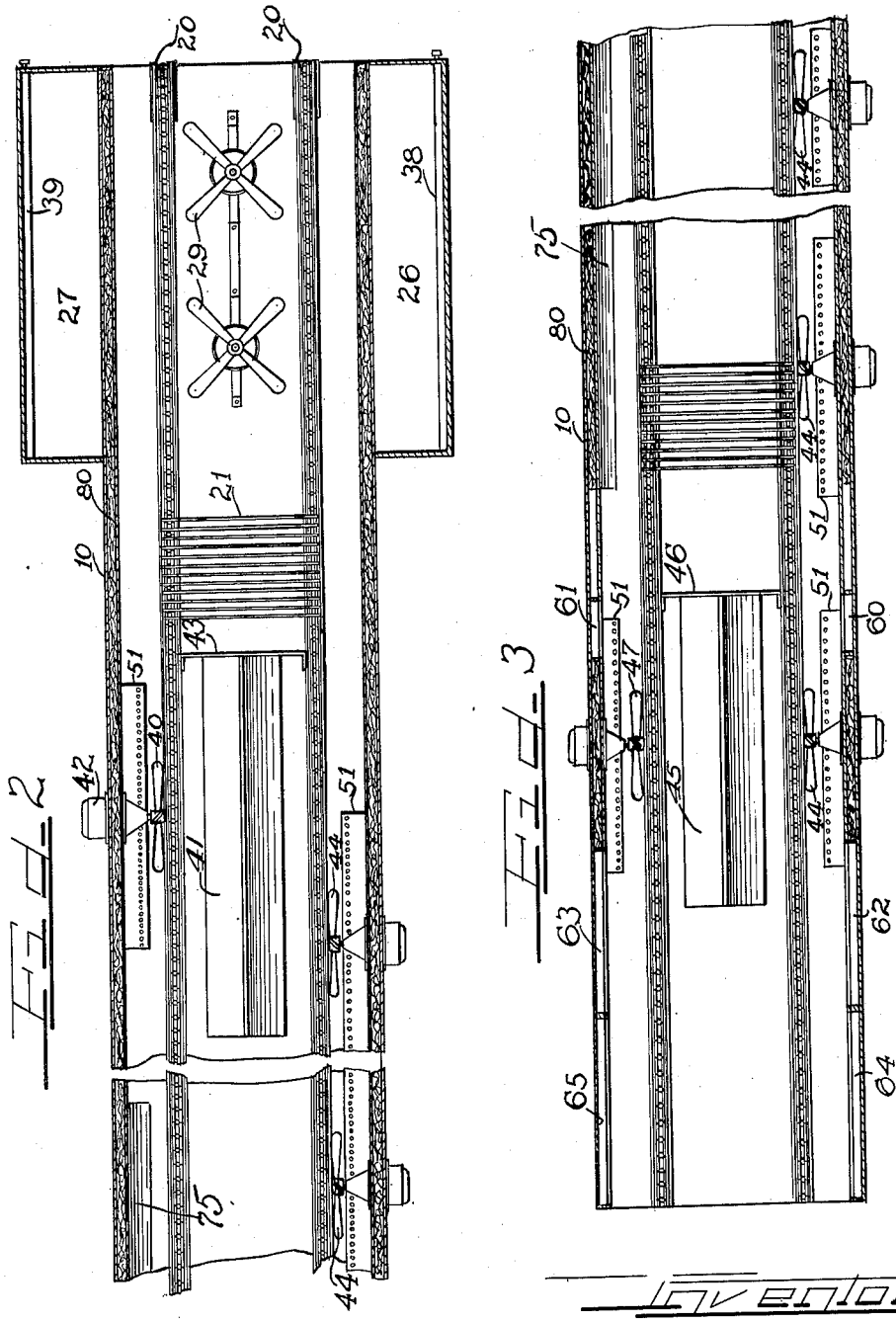

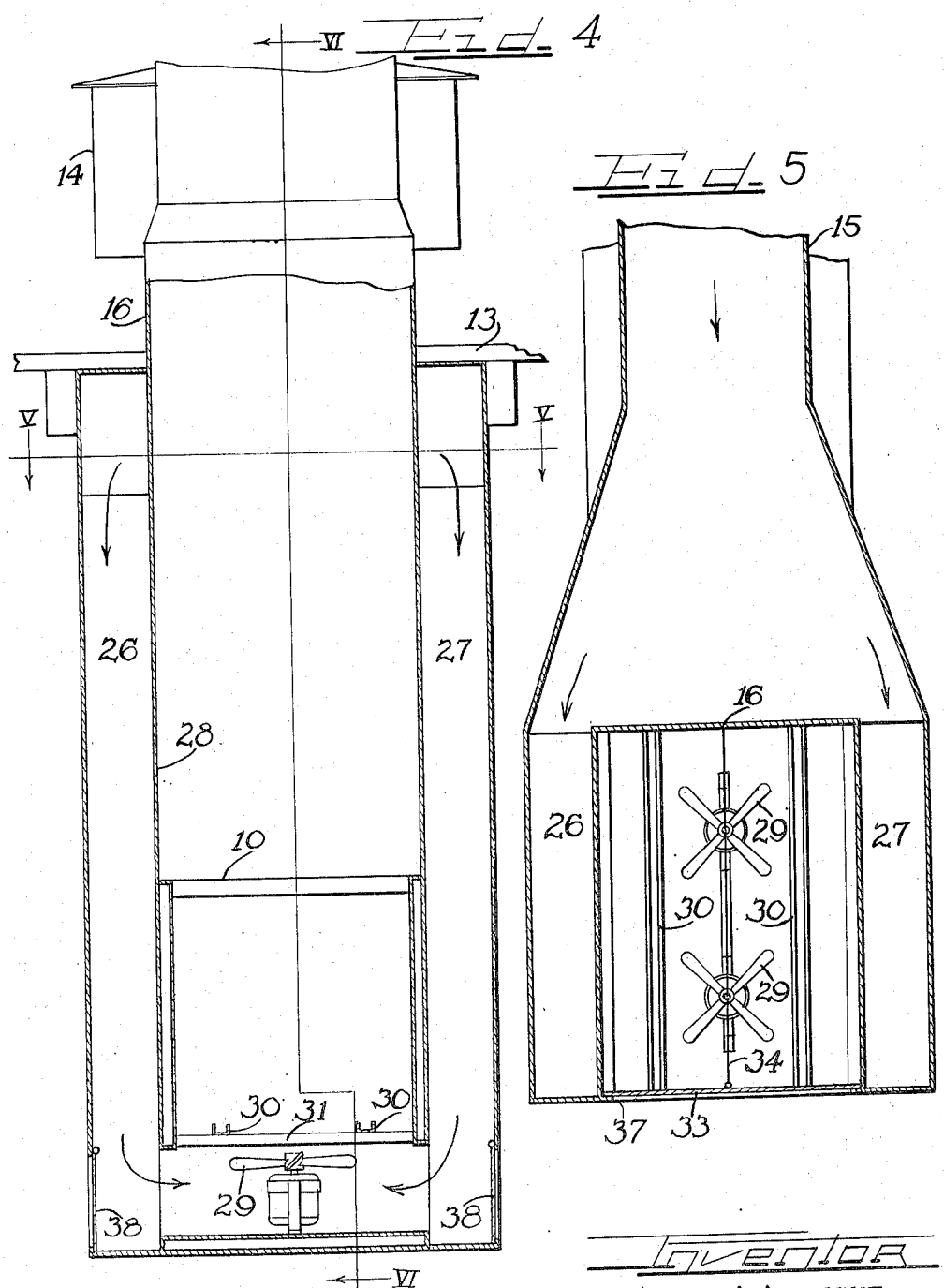

Sept. 13, 1938.　　　E. A. ALBRIGHT　　　2,129,634
OVEN CONSTRUCTION
Filed Aug. 24, 1936　　　5 Sheets-Sheet 4
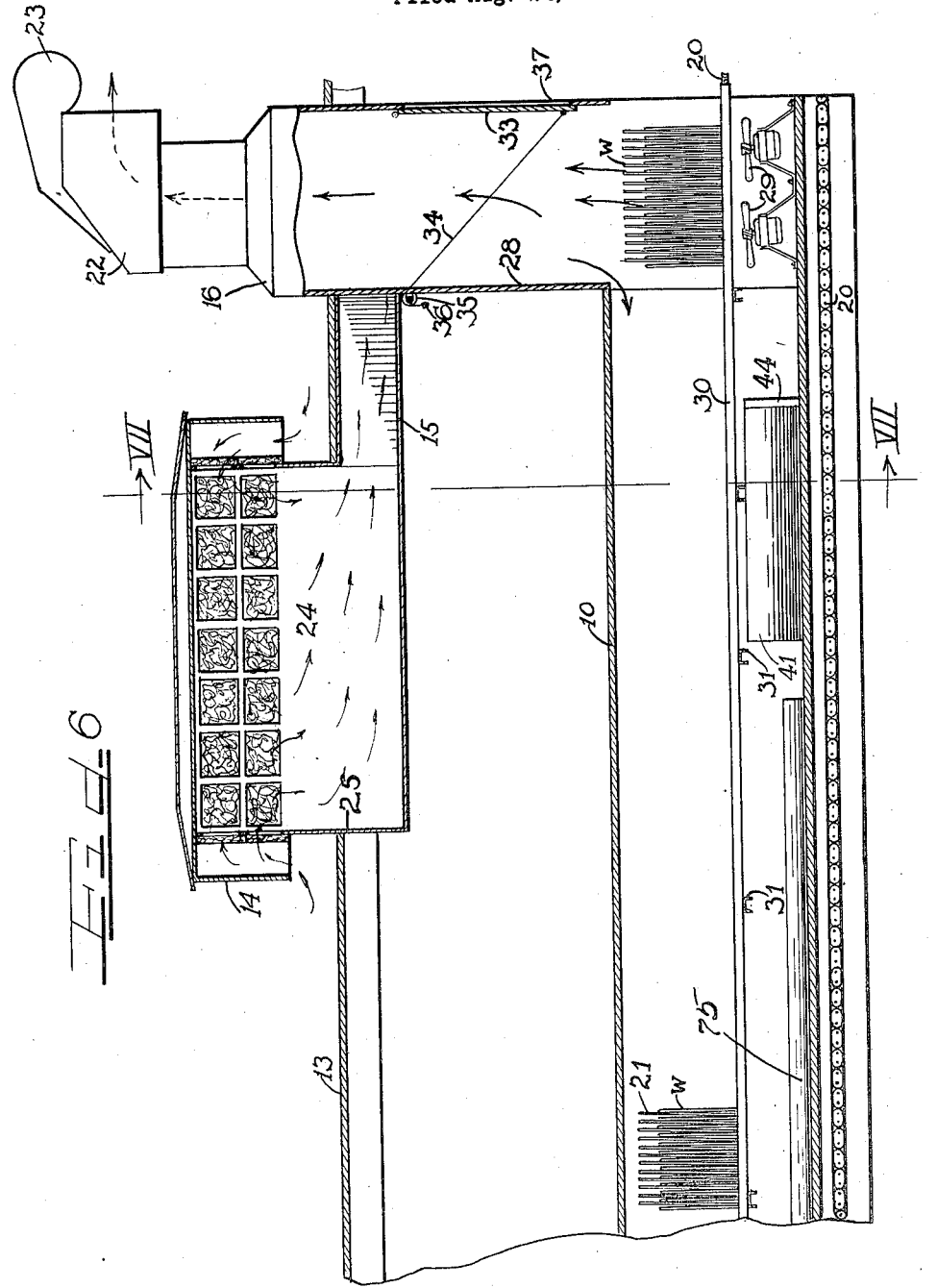
Inventor
EDWARD A. ALBRIGHT

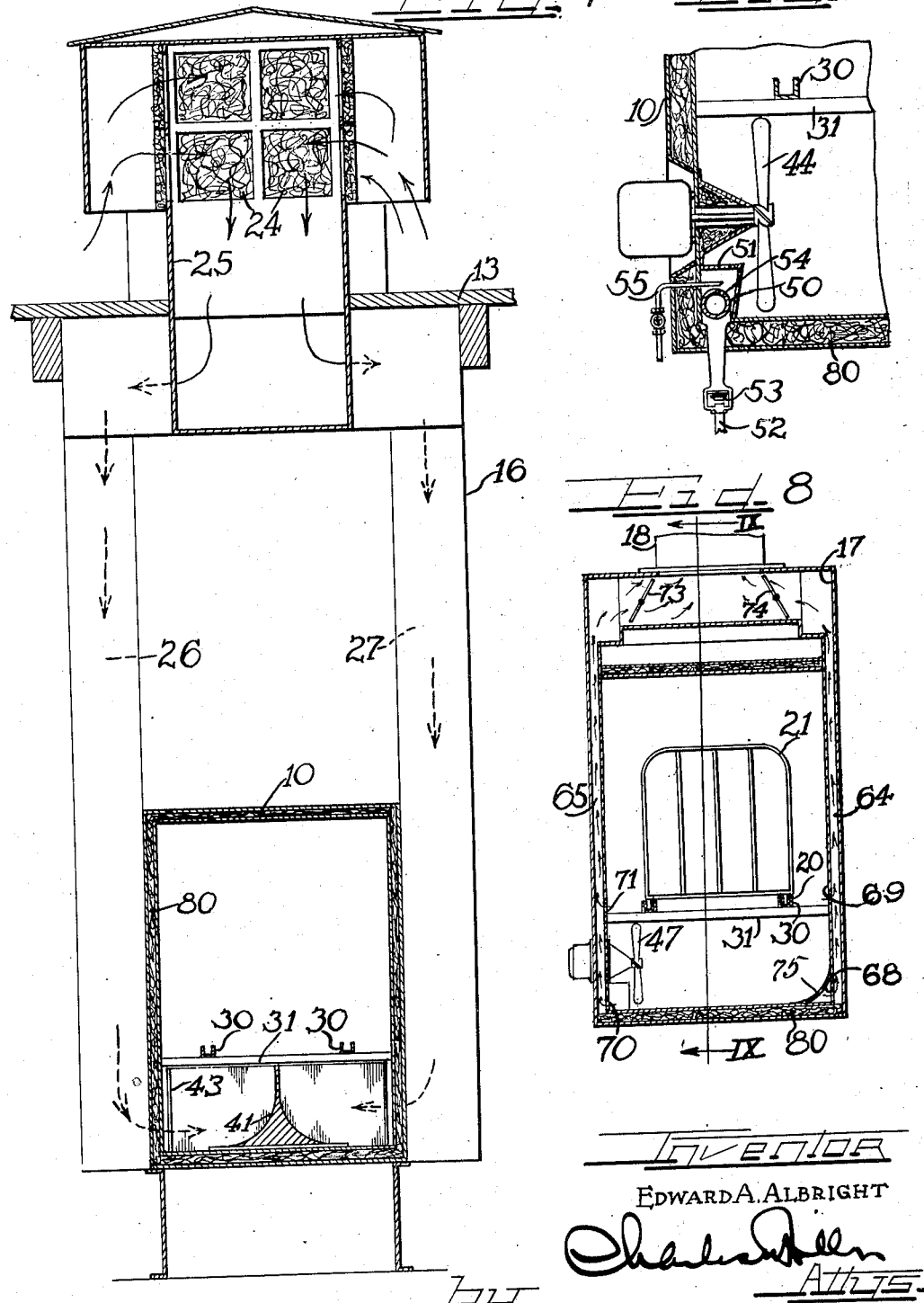

Patented Sept. 13, 1938

2,129,634

UNITED STATES PATENT OFFICE 2,129,634

OVEN CONSTRUCTION

Edward A. Albright, Berwyn, Ill., assignor to Caspers Tin Plate Company, Chicago, Ill., a corporation of Illinois Application August 24, 1936, Serial No. 97,633

11 Claims. (Cl. 34—12)

This invention relates to drying or baking oven constructions and more particularly to the circulation and heating of air in such ovens.

The invention will be hereinafter specifically described in connection with a baking oven for drying and/or baking coatings such as enamel, varnish or lacquer on metal plates. It should be understood, however, that the oven construction of this invention is adapted for many different uses wherein articles are to be heat treated, dried or baked.

In drying or baking ovens, one of the main problems is to efficiently circulate and heat the drying or baking gas, such as air, so as to prevent formation of "hot spots" in the oven. It is also desirable to obtain an efficient absorption of moisture or vapors into the air so as to overcome the heat losses attendant with the heating of large volumes of air.

According to this invention the articles to be dried or baked are passed through the oven on an endless conveyor from the inlet to the outlet end of the oven. The drying or baking gas, such as air, is filtered and drawn into the oven by forced or natural circulation to flow in a helical path through the oven in a direction opposite to the direction of the articles passing through the oven. The air or drying gas is heated by a plurality of heating elements disposed along the length of the oven and the air is caused to come in contact with the heating elements by fans disposed in the oven adjacent the heating elements. These fans impart a whirling action to the air which, coupled with the natural or forced circulation of the air through the oven, creates a helical path for the air. The air, in its helical path, is circulated over the heating elements and around the articles passing through the oven. The moisture or vapor-laden air is then discharged by the work inlet end of the oven up through a stack into the outside atmosphere.

If desired, a cooling tower can be provided at the work outlet end of the oven. According to this invention the cooling tower includes a stack vented to the outside atmosphere with air propelling means located at the bottom of the stack to blow filtered air through the conveyor and around the dried or baked articles for cooling these articles. Most of the air is circulated up the stack out into the atmosphere but some of the air is directed into the oven by natural or forced circulation. In this manner, heated air from the oven is not discharged at the work outlet end of the oven, but, on the secondary, is circulated through the oven to be discharged in a moisture-laden condition adjacent the work inlet end of the oven.

The invention includes improved duct arrangements for discharge of moisture-laden air without cooling the inlet end of the oven, and without interfering with the helical path of the air.

It is then an object of this invention to provide oven constructions having highly efficient heating and air circulation means.

A further object of this invention is to provide oven constructions with individually regulated heating elements disposed along the length of the oven and each having an air propelling device adjacent thereto for circulation of air in the oven therearound.

A further object of this invention is to impart a helical flow to air circulated through a baking or drying oven.

Another important object of this invention is to provide a drying or baking oven having articles conveyed therethrough with an air circulation system whereby the air circulates in a direction opposite to the direction of passage of articles through the oven and is given a whirling motion as it passes through the oven to prevent the formation of "hot spots" therein.

A specific object of this invention is to provide an oven construction wherein air is filtered, propelled over the work being discharged from the oven to cool the work, divided into two streams one of which enters into the oven at the work discharge end, circulates through the oven in a helical path, is heated by contact with heating elements disposed in the oven and is discharged in a moisture-laden condition adjacent the work inlet end of the oven.

Other and further objects of this invention will become apparent to those skilled in the art from the following detailed description of the annexed sheets of drawings which disclose preferred embodiments of the invention.

On the drawings:

Figure 1 is a side elevational diagrammatic view of a drying or baking oven construction according to this invention;

Figure 2 is an enlarged broken horizontal cross sectional view taken substantially along the line II—II of Figure 1;

Figure 3 is an enlarged broken horizontal cross sectional view taken substantially along the line III—III of Figure 1;

Figure 4 is an enlarged fragmentary vertical cross-sectional view taken substantially along the line IV—IV of Figure 1;

Figure 5 is a fragmentary horizontal cross sectional view taken substantially along the line V—V of Figure 4;

Figure 6 is a fragmentary vertical cross sectional view, with parts in elevation, taken substantially along the line VI—VI of Figure 4;

Figure 7 is an enlarged vertical cross sectional view, taken substantially along the line VII—VII of Figure 1;

Figure 8 is an enlarged vertical cross sectional view taken substantially along the line VIII—VIII of Figure 1;

Figure 9 is a fragmentary vertical cross sectional view taken substantially along the line IX—IX of Figure 8; and Figure 10 is a fragmentary enlarged vertical cross sectional view taken substantially along the line X—X of Figure 1.

As shown on the drawings:

In Figure 1, the reference numeral 10 designates an elongated housing defining the heating chamber of the baking or drying oven of this invention. The housing 10 has a work inlet opening 11 and a work discharge opening 12 at opposite ends thereof. The housing 10 is preferably mounted within a building having a roof 13.

An air filter 14 is mounted on the roof 13 of the building for filtering atmospheric air which is drawn into the filter, passes through a duct 15 and into ducts (not shown) as will be hereinafter more fully described, of a cooling tower 16. Part of the air from the cooling tower is circulated through the housing 10, as will be more fully hereinafter described, and is discharged after absorbing moisture and vapors from work being passed through the oven at the work inlet end 11 of the housing 10 in a header duct 17 communicating with a discharge stack 18. The stack 18 may have a fan 19 therein to produce a forced circulation of air from the end 12 to the end 11 of the housing 10. It should be understood, however, that a forced circulation of this air is not necessary in all instances since the air will circulate through the housing 10 by natural circulation.

The work to be dried or baked is carried on an endless conveyor 20 between racks 21 secured on the conveyor 20. The work is indicated by the reference character W.

The cooling tower 16 is preferably equipped with a swivel top 22 having a wind vane 23 thereon so that air discharged from the cooling tower will be ejected in the direction of the surrounding wind.

As shown in Figures 4, 5, 6 and 7, atmospheric air is drawn into the filter 14 around the periphery thereof as shown by the arrows and is filtered through mats 24 of porous filtering material such, for example, as spun glass, rock wool or the like, flows downward through a central duct 25 (Figure 7) through the duct 15 and into vertical ducts 26 and 27 on each side of the cooling tower 16 to the base of the tower where, as indicated in Figure 4, the air is drawn through openings at the bottoms of the ducts 26 and 27 and propelled upward through the stack 28 of the cooling tower by means of motor driven fans 29. The air in its passage upward through the stack 28 flows through the endless conveyor 20 and around the work W as indicated in Figure 6.

The endless conveyor 20 may consist of two chains slidably mounted in channel beams 30 extending the full length of the housing 10 and through the cooling tower 16. The channel beams 30 serve as tracks to carry the endless chain. These beams 30 are supported on transverse members 31 extending across the width of the oven as indicated in Figures 4, 6 and 7.

As shown in Figures 1 and 9, the conveyor chain 20 is trained around sprocket gears 32 at the ends of the oven construction and returns from the discharge end of the cooling tower 16 back to the work inlet end 11 of the oven under the base of the oven.

The passage of air from the fans 29 upward through the stack 28 of the cooling tower 16 is therefore not obstructed by the conveyor chain or its supporting mechanism.

Since the work being discharged from the oven 10 is heated to a considerable degree, air blown over this work by the fans 29 is heated by contact therewith and cools the work so that it can be manually discharged from the conveyor.

In cold weather the heated air rising up the stack 28 of the cooling tower 16 can be discharged into the room in which the oven is mounted by raising a damper 33, as shown in Figure 6, provided in an end wall of the cooling tower 16. For this purpose a cable 34 is secured to the damper 33 and extends over a pulley 35 located outside of the cooling tower 16. A handle or gripping means 36 is provided at the end of the cable so that when the cable is pulled downward over the pulley 35 the damper 33 is raised in the cooling tower 16 to shut off any amount of hot air from being discharged through the roof. When the damper 33 is opened, the heated air is discharged through the opening 37 provided in the end wall of the cooling tower.

Dampers 38 are also provided in the lower ends of the ducts 26 and 27 as shown in Figure 4. These dampers can be opened to feed room air to the fans 29.

Part of the air rising through the stack 28 of the cooling tower 16 enters into the housing 10 by virtue of a forced draft created by a slight tilting of the fans 29 as shown in Figure 6 or by the suction effect of the fan 19 in the discharge duct 18 as shown in Figure 1. Furthermore a forced circulation of air through the housing 10 from the work discharge end toward the work inlet end thereof is not essential since air will naturally flow through the housing in this direction.

The air introduced into the housing from the stack 28 of the cooling tower 16 is directed by a fan 40 mounted in the rear wall of the housing 10 against a baffle plate 41 (Figure 2) mounted in the center of the housing at the bottom thereof in front of the fan 40. As shown in Figure 2, the fan 40 is driven by a motor 42. This fan is located beneath the conveyor chain and track. The air is directed upwardly in the oven by the baffle 41 and is held in the oven by an end baffle plate 43 mounted at right angles to the baffle 41.

A plurality of motor driven fans 44 are mounted on the front wall of the housing 10 near the bottom thereof as shown in Figures 1 to 3 beneath the conveyor chain and track. The fan 44 closest to the cooling tower 16 is disposed in front of the baffle plate 41 so as not to interfere with the fan 40 on the other side of the baffle plate.

As shown in Figure 3, a second baffle plate 45 is mounted in front of the fan 44 closest to the work inlet opening of the housing 10. The baffle plate 45 is also provided with an end plate 46 at right angles thereto to prevent a discharge of air through the work inlet opening.

A motor driven fan 47 is mounted on the rear wall of the housing 10 opposite to the fan 44 closest to the inlet opening.

The fans 40, 44 and 47 impart a whirling action to air being circulated through the housing and prevent the formation of "hot spots" within the oven. The air is at all times kept in circulation and efficiently flowed around the work so as to obtain a maximum moisture vapor absorption from the work being dried or baked.

As best shown in Figure 10, a burner head 50 is mounted behind each fan 44, as well as behind the fans 40 and 47. Each burner head 50 extends horizontally beneath a perforated L-shaped plate 51 cooperating with the inside walls of the housing 10 to form rectangular boxes around the burner heads.

A fluid fuel such as oil or gas is fed through the burner head through individual feed pipes 52 (Figure 10) under pressure and is admixed with suitable quantities of air by means of the usual air inlet throat 53 and this combustible mixture of air and fluid fuel is then introduced into the burner head 50 where the same burns in open jets provided by perforations or slots 54 in the burner head 50. The perforated plate 51 serves to prevent the air circulated by the fans from blowing out the flames projecting from the openings 54. A pilot 55 can be provided for each burner head 50 to ignite the combustible mixture issuing from the openings therein.

Thus the air is circulated by the fans 40, 44 and 47 over the heated plates 51 as well as partially through the perforations of said plate around the burner head. This heated air is then propelled in a whirling path around the work passing through the oven and is kept in motion at all times by the fans so as to prevent formation of "hot spots". The heated air absorbs moisture and other volatiles from the work.

As best shown in Figures 3, 8 and 9, a plurality of ducts 60, 61, 62, 63, 64 and 65 are provided in the side walls of the housing 10 near the work inlet end of the oven. These ducts communicate with the heating chamber through openings or slots 66, 67, 68, 69, 70, and 71 both below and immediately above the work conveyor.

The upper ends of the ducts 60 to 65 communicate with the header duct 17 described in Figure 1 as shown in Figures 8 and 9. A transverse damper 72 is provided in the duct 17 for controlling the volume of air flow thru the ducts 60 and 61. Longitudinal dampers 73 and 74 are also provided in the duct 17 as shown in Figures 8 and 9 to control the air flow from the ducts 62 to 65 inclusive. As shown in Figures 1 and 8, the header duct 17 communicates with the discharge stack 18.

This arrangement of ducts provides for a gradual dissipation of moisture and vapor laden air from the work inlet end of the oven without interfering with the circulation of air around the work at the inlet end. As indicated in Figure 8, the fan 47 as well as the fan 44 closest to the inlet end of the oven shown in Figure 3 circulates the heated air around the incoming work and part of this air is tapped off by the openings 66 to 71 of the ducts to be discharged through the stack 18 in amounts controlled by positioning of the dampers 72 to 74. The plurality of ducts are provided for a gradual withdrawing of the moisture-laden air so as not to interfere with the air circulation in the inlet end of the oven.

As shown in Figures 1 and 9, a hood H is disposed over the conveyor and work entering the oven to trap vapors issuing from the work so that these vapors will be discharged together with the vapor-laden air through the stack 18. The oven is so regulated, however, that air does not discharge thru the work inlet end thereof.

As shown in Figures 2, 3, 7, 8, 9 and 10, the housing 10 is provided with an inner and an outer wall having insulation 80 therebetween.

From the above description it should be understood that the specific oven described in the annexed drawings includes an elongated housing 10 defining an open ended heating chamber. Work is passed through the housing on an endless conveyor and upon introduction into the oven is immediately heated by hot air circulated around the work to drive off volatiles therefrom. As the work advances through the heating chamber it has circulated therearound at all times heated air of decreasing moisture or vapor content so that as the moisture or vapor content of the work decreases the air for removing the remaining quantities of moisture or vapor is drier than the air previously contacting the work.

Upon issuing from the heating chamber the work is passed through a cooling tower where it is subjected to blasts of cold air which cool the work. Some of the cold air blasts which are heated by contact with the work are introduced into the heating chamber to form the drying gas. A large portion of the cold air blast, however, is discharged to the atmosphere in warm weather or into the room housing the oven during cold weather. All air introduced to the cooling tower and to the oven is filtered.

Opposite the single fans 44 a curved deflector 75 extends lengthwise of the oven, between the baffles 41 and 45. The deflector 75 is placed along the junction of the oven bottom and the wall opposite to that which supports the several fans 44, to hurl the air upwardly from the bottom as the fans operate.

The air circulating through the oven is continuously agitated and whirled around therein to maintain uniform temperature in the oven.

The oven construction of this invention provides for a quick heating of the work up to its drying or baking temperature and a maintenance of this heating at a uniform rate throughout the entire length of the oven right up to the work discharge end thereof.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an oven construction, a housing defining a heating chamber having an air inlet and an air outlet at opposite ends thereof whereby air can be circulated longitudinally through the chamber, a plurality of burner heads in said chamber along the bottom thereof disposed longitudinally of the chamber, means for feeding a combustible mixture to the burner heads to be burned thereby, guard plates disposed in spaced relation around each burner head, and fans in said chamber in front of the guard plates and facing transversely of said chamber for circulating air in the chamber over the plates to be heated thereby and to impart a whirling action to the air passing through the chamber.

2. In an oven construction, a housing defining a heating chamber having an air inlet and an air outlet at opposite ends thereof whereby air can be circulated through the chamber, a plurality of burner heads in said chamber intermediate the ends thereof, means for feeding a combustible mixture to the burner heads to be burned thereby, perforated guard plates in the chamber disposed over each burner head, and fans disposed in the chamber adjacent the guard plates for circulating air in the chamber over the plates to be heated thereby and to agitate the air for maintaining a uniform temperature throughout the various zones of the oven.

3. A drying or baking oven construction comprising top, bottom and side walls defining an open ended tunnel, a conveyor extending through said tunnel for carrying work therethrough, a plurality of perforated gas pipes disposed longitudinally along the bottom of the tunnel adjacent a side wall thereof, guard plates disposed over said pipes and defining with the side and bottom walls of the tunnel an open ended rectangular box around each pipe, fans in front of said guard plates facing the opposite side wall of the tunnel, means for circulating air longitudinally through the tunnel in a direction opposite to the direction of travel of the conveyor therethrough and means for rotating said fans for whirling the air being circulated through the housing to travel around the work and over the guard plates to become heated by contact therewith.

4. In an oven construction, a cooling tower, fans at the base of said cooling tower for blowing air upward through the tower, an elongated heating chamber having a work discharge end adjacent the cooling tower and a work inlet end spaced from the tower, a work conveyor extending through said heating chamber and through said tower over said fan means whereby heated articles from the chamber are cooled by the blast of air from the fan means, means for drawing a portion of the air circulated around the articles as the same pass through the cooling tower into the heating chamber to travel longitudinally therethrough toward the inlet end thereof, means for discharging said air at the inlet end of the chamber, and means for imparting a whirling action to said air in said heating chamber whereby the air passes through the chamber in a spiral path.

5. A cooling tower for drying or baking ovens comprising an apertured stack adjacent the discharge end of the oven adapted to receive articles issuing from the oven through the apertures thereof, said stack being vented to the atmosphere, fan means near the bottom of said stack, air ducts for supplying air to said fan means whereby an upward blast of air is created to circulate around the articles issuing from the oven to cool said articles and a damper permitting the discharge of heated air circulated around the articles from the stack into the room or upward through the stack into the outside atmosphere.

6. In an oven construction, an air filter adapted to filter atmospheric air, a cooling tower, ducts extending alongside of said cooling tower in communication with the air filter for receiving filtered air therefrom, fan means at the base of said cooling tower for receiving filtered air from said ducts, a central stack in said cooling tower for receiving the air propelled by said fan means, said stack being vented to the outside atmosphere, an elongated heating chamber having a discharge end adjacent said central stack and an inlet end spaced from the stack, a work conveyor extending through said heating chamber and through said stack over the fan means therein whereby the heated articles from the heating chamber are cooled by the blast of air from the fan means, means for drawing a portion of the air circulated around the articles into the heating chamber to travel longitudinally therethrough in a direction opposite to the direction of the travel of work through the chamber, means for discharging said air at the inlet end of the chamber and means for imparting a whirling action to said air in said heating chamber whereby the air passes through the chamber in a spiral path.

7. In an oven construction, top, bottom and side walls defining an elongated tunnel, a plurality of perforated fluid burner heads in spaced relation along the bottom of said tunnel disposed adjacent a side wall thereof, means for supplying a combustible mixture to said burner heads, L-shaped guard plates having one leg thereof disposed over each burner head and the other leg thereof disposed in front of the burner head for defining with the adjacent side wall and bottom of the tunnel a rectangular open ended box around each burner head, and fan means adjacent said guard plates facing the opposite side wall of the tunnel for circulating air in the tunnel over the plates to be heated by contact therewith.

8. In an oven construction, top, bottom and side walls defining an elongated heating chamber, a plurality of perforated gas pipes extending longitudinally at the sides of the chamber in spaced relation along the bottom of said chamber, L-shaped guard plates having one leg disposed over each pipe and the other leg disposed in front of each pipe to define with the side and bottom walls of the chamber open ended boxes around each pipe and means for supplying a combustible mixture to the pipes to be burned thereon.

9. An oven construction comprising an elongated housing defining a heating chamber having work inlet and work outlet openings at opposite ends thereof, a conveyor for carrying work through said heating chamber, a plurality of burner heads disposed along a side wall of said heating chamber near the bottom thereof, a motor propelled fan disposed in front of each burner head and facing the opposite side wall of the chamber for circulating air in the chamber around the burner heads and baffle plates along the bottom of said heating chamber to direct air propelled by said fans.

10. An oven construction comprising top, bottom and side walls defining an elongated open ended tunnel, a conveyor extending through said tunnel in spaced relation above the bottom wall thereof, burner heads in the bottom of said tunnel extending along the side walls thereof, fans adjacent said burner heads and facing the opposite side wall of the tunnel, some of said burner heads and some of said fans being substantially opposite each other and a baffle along the bottom of said tunnel having an upwardly extending lip between the oppositely disposed fans for deflecting air propelled by the fans upwardly through the work conveyor.

11. In an oven construction, a heating chamber, a burner for a combustible mixture positioned along a side wall of the chamber at the bottom of the chamber, a guard plate having one leg thereof disposed over the burner and the other leg thereof disposed in front of the burner for defining with the chamber a box around the burner and a fan adjacent said guard plate facing the opposite side wall of the heating chamber for circulating air in the chamber over the plate to be heated thereby.

EDWARD A. ALBRIGHT.